United States Patent [19]

Yoshinari et al.

[11] Patent Number: 4,753,777

[45] Date of Patent: Jun. 28, 1988

[54] APPARATUS FOR CONTINUOUS PRODUCTION OF CARBON FIBERS

[75] Inventors: Osamu Yoshinari; Makoto Sugiyama; Hideki Nakai, all of Shizuoka, Japan

[73] Assignee: Toho Beslon Co., Ltd., Tokyo, Japan

[21] Appl. No.: 743,843

[22] Filed: Jun. 12, 1985

Related U.S. Application Data

[62] Division of Ser. No. 486,168, Apr. 18, 1983, Pat. No. 4,543,241.

[51] Int. Cl.[4] .......................... D01F 9/14; B01J 15/00

[52] U.S. Cl. ...................................... 422/150; 34/155; 422/199; 422/202; 423/447.7; 432/59

[58] Field of Search ............... 422/150, 233, 199, 202, 422/204; 423/447.1, 447.7, 447.8, 447.9; 432/59; 34/94, 154, 152, 155, 151

[56] References Cited

U.S. PATENT DOCUMENTS

| | | | |
|---|---|---|---|
| 3,618,914 | 11/1971 | Best | 34/152 |
| 3,745,104 | 7/1973 | Hou | 423/447.1 |
| 3,772,429 | 11/1973 | Basche et al. | 423/447.7 |
| 4,073,870 | 2/1978 | Saji et al. | 423/447.6 |
| 4,217,090 | 8/1980 | Whike et al. | 432/59 |
| 4,301,136 | 11/1981 | Yamamoto et al. | 423/447.6 |
| 4,314,981 | 2/1982 | Miyamori et al. | 423/447.8 |

FOREIGN PATENT DOCUMENTS

| | | | |
|---|---|---|---|
| 47-26965 | 7/1972 | Japan | 423/447.7 |
| 47-26969 | 7/1972 | Japan | 423/447.7 |

*Primary Examiner*—Michael S. Marcus

*Attorney, Agent, or Firm*—Sughrue, Mion, Zinn, Macpeak, and Seas

[57] ABSTRACT

A method for producing carbon fibers in a vertical carbonizing furnace and an apparatus for producing carbon fibers using such a method are disclosed. The furnace includes a heating chamber for carbonizing fibers, the furnace including, (i) a fiber inlet at the upper end of the chamber (ii) an air tight sealed fiber outlet at the lower end of the furnace, (iii) an inert gas inlet provided on the wall of the chamber and above the fiber outlet, (iv) at least one inert gas injection portion, formed on the wall of the chamber, each capable of forming a curtain of inert gas across the heating chamber, each injection portion being provided between the gas inlet and the fiber inlet, (v) at least one outlet each being provided below each inert gas injection portion, and (vi) a heating member capable of controlling the temperature in the heating chamber in such a manner that the temperature gradually increases from the upper end toward a lower end of the heating chamber. The carbon fibers produced by this method or apparatus are excellent in that they have few fluffs and cohering filaments and improved strength and ductility.

12 Claims, 1 Drawing Sheet

FIG.1
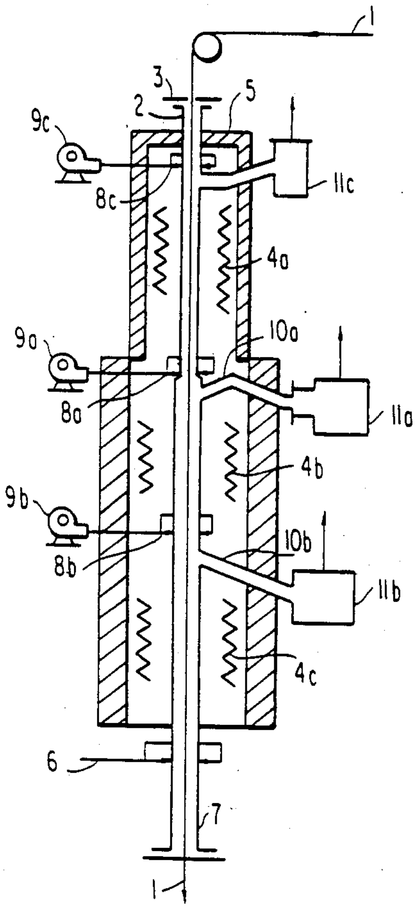
FIG.3
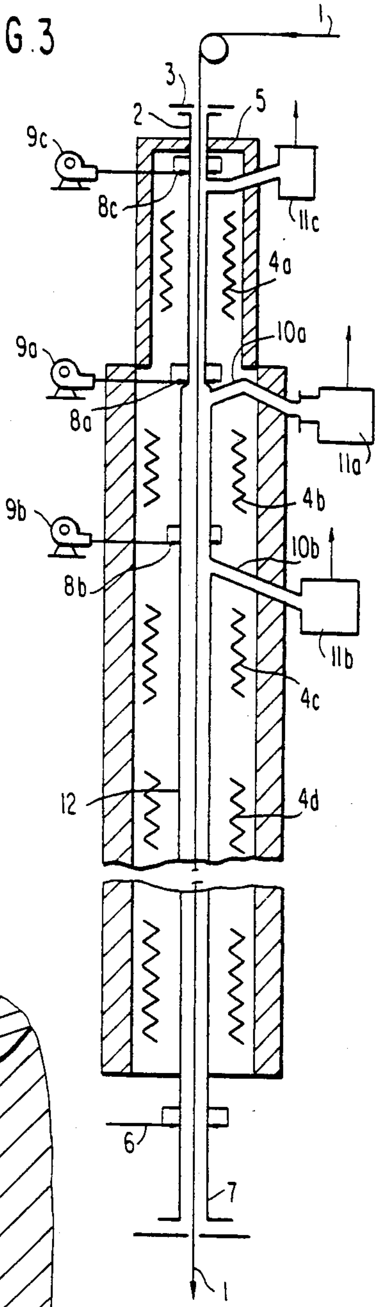
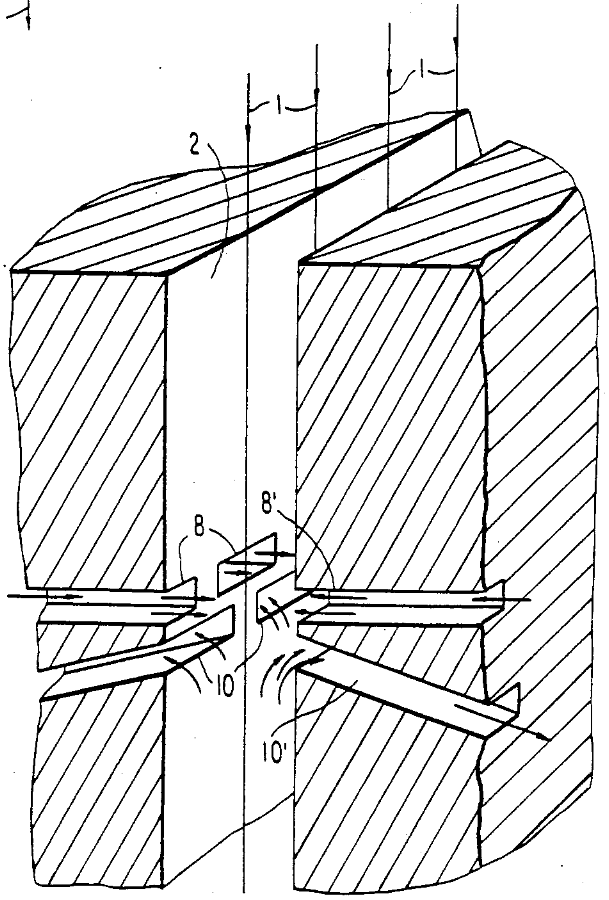
FIG.2

APPARATUS FOR CONTINUOUS PRODUCTION OF CARBON FIBERS

This is a division of application Ser. No. 486,168, filed Apr. 18, 1983, now U.S. Pat. No. 4,543,241.

FIELD OF THE INVENTION

The present invention relates to a method for continuous production of carbon fibers and a vertical carbonizing apparatus for conducting the method. More particularly, the invention relates to a method using a vertical carbonizing furnace through which a fiber stock is guided downwardly and which is provided in the carbonizing chamber with at least one inert gas injection hole for forming a curtain of inert gas, as well as another hole made in the vicinity of said injection hole through which to draw a gas out of the carbonizing chamber, and to an apparatus for producing carbon fibers in such a manner.

BACKGROUND OF THE INVENTION

The production of carbon fibers generally consists of preoxidizing organic fibers (e.g. polycrylonitrile fibers or cellulose fibers) in an oxidizing atmosphere to render them flame-retardant, and feeding the preoxidized fibers into a carbonizing furnace where they are carbonized in an inert gas atmosphere or a non-oxidizing atmosphere at a temperature of 300° C. or higher. In this carbonizing step, the preoxidized organic fibers are thermally decomposed into carbon fibers. The carbonization is usually effected at a temperature between 300° and 1,500° C., sometimes higher than 1,500° C., and if necessary, at the graphitization temperature of 2,000° C. or more (see U.S. Pat. Nos. 4,073,870 and 4,321,446).

The carbon fibers produced by the above described conventional method has very low strength and ductility due not only to internal defects from microvoids but also to surface defects such as cracks. Therefore, to produce carbon fibers of high performance, the presence of surface defects must be minimized. In the carbonizing step, the preoxidized fibers release various decomposition products as they are carbonized at increasing temperatures, and the release of most decomposition products is known to occur in a temperature range of 300° to 900° C. The decomposition products formed in this temperature range, for example, HCN, $NH_3$, CO, $H_2$, $H_2O$, $CH_4$, $CO_2$ and higher molecular weight saturated and unsaturated hydrocarbons having 3 to 7 carbon atoms are gaseous under the temperature conditions where they are produced. However, in a vertical carbonizing furnace where preoxidized fibers are guided down through a heating chamber in which the temperature increases from the top to bottom, the gaseous decomposition products (hereunder decomposition gases) are carried by the ascending gas stream into the low-temperature zone of the furnace where the higher molecular weight hydrocarbons are cooled to form a tar mist. Part of the decomposition products now in the form of a tar mist is deposited on the inner surface of the furnace wall or the fiber surfaces. The sticky tar mist on the wall surfaces catches fiber fuzz adrift in the furnace and grows during continuous furnace operation. Ultimately it contacts and damages the surface of the fiber passing through the furnace or partially obstructs the passage of the fibers to upset the uniform flow of the gas stream. If the contact between the fibers and the tar mist is extreme, the individual filaments stick to each other, and the buildup of tar mist at elevated temperatures causes surface defects that greatly reduce the strength and ductility of the carbon fiber product. Furthermore, decomposition gases such as $H_2O$, $CO_2$ and CO lower the fiber strength appreciably when they contact the fibers in the high-temperature zone of the furnace.

SUMMARY OF THE INVENTION

An object of the present invention is to provide a method for continuous production of carbon fibers having high performance.

Another object of the present invention is to provide an apparatus capable of continuous production of carbon fibers having high preformance.

The present invention has been accomplished as a result of studies to develop an effective method and apparatus of removing decomposition gases (that have been produced at between about 300° and 900° C.) from a vertical carbonizing furnace of the type described above wherein preoxidized filaments are fed from above and are carbonized as they are guided substantially vertically through the furnace.

The object of the present invention can be attained by a method which comprises using a vertical carbonizing furnace having a heating chamber, heating the chamber in such a manner that the temperature gradually increases from the upper end toward a lower end of the heating chamber, introducing a fiber to be carbonized from a fiber inlet provided at the upper end of the chamber, introducing an inert gas from the gas inlet provided at lower end of the chamber to maintain the atmosphere in the chamber nonoxidizing atmosphere, injecting an inert gas from at least one portion between the fiber inlet and the gas inlet to form a curtain of the inert gas across the heating chamber to prevent decomposition gases formed in the heating chamber to ascend, discharging the decompostion gases with the inert gas from at least one gas outlet each being provided at a lower portion of each inert gas injection portion, and recovering carbonized fiber from a fiber outlet provided at the lower portion of the heating chamber.

The method of the present invention can be carried out by using an apparatus which comprises:

a vertical carbonizing furnace having a heating chamber therein for carbonizing fibers, the furnace including, (i) a fiber inlet at the upper end of the chamber, (ii) an air tight sealed fiber outlet at the lower end of the furnace, (iii) an inert gas inlet provided on the wall of the chamber and above the fiber outlet, (iv) at least one inert gas injection portion, formed on the wall of the chamber, each capable of forming a curtain of inert gas across the heating chamber, each injection portion being provided between the gas inlet and the fiber inlet, (v) at least one gas outlet each being provided at a lower portion of each inert gas injection portion, and (vi) a heating member capable of controlling the temperature in the heating chamber in such a manner that the temperature gradually increases from the upper end toward a lower end of the heating chamber.

BRIEF DESCRIPTION OF THE DRAWINGS

FIG. 1 is a schematic cross section of one embodiment of the apparatus of the present invention;

FIG. 2 is an enlarged schematic view showing the inert gas injection portions, gas outlets and the nearby area of an apparatus according to another embodiment of the present invention; and FIG. 3 is a schematic cross section of an apparatus according to another embodiment of the present invention.

DETAILED DESCRIPTION OF THE INVENTION

When preoxidized fibers are carbonized by the method of the present invention or carbonized in the apparatus of the present invention, the flowing of the decomposition gases produced in the higher-temperature zone into the lower-temperature zone can be prevented or reduced, thereby tar mist deposition on the inner wall surface or fiber surfaces can also be prevented or reduced. Furthermore, it is also possible to prevent or reduce the decomposition gases from contacting the surface of the fibers being carbonized. Thus, carbon fibers of consistently good quality can be produced over an extended period. The apparatus of the present invention is effectively used for carbonizing preoxidized fibers in a temperature range of about 300° to 900° C. where the formation of thermal decomposition gases is particularly noticeable.

Illustrative fibers that can be effectively treated by the method or by the apparatus of the present invention include preoxidized fibers obtained from acrylic or cellulose fibers that generate thermal decomposition gases when they are subjected to the ordinary carbonization step. These fibers are fed to the heating chamber usually in the form of a strand or tow made up of about 100 to 500,000 filaments, or in a fabric or nonwoven cloth form. Any number of strands or tows may be guided through a single heating furnance at the same time. When fibers are supplied as strands, the apparatus of the present invention is able to increase the strand spacing to about twice as large as that permissible with an apparatus having neither inert gas injecting portion nor gas outlet provided below the gas injection portion.

The method and the apparatus of the present invention is hereunder described in greater detail by reference to the accompanying drawings. FIG. 1 is a schematic cross section of one embodiment of the apparatus. In this figure, fibers 1 to be treated are introduced into a heating chamber 2 for carbonizing the fibers. The inner space of the heating chamber 2 serves both as a carbonizing chamber and as the passage way for the fibers. The upper end of the heating chamber is provided with a fiber inlet 3 and is open to air. The lower end of the heating chamber is provided with a fiber outlet 7 which communicates with a sealing mechanism (not shown). The heating chamber 2 is surrounded by heating elements 4*a*, 4*b* and 4*c*.

At the upper end of the heating chamber, an ascending gas stream establishes a seal to prevent the entrance of the atmosphere into the chamber. It is preferred to provide a gas outlet 5 below the fiber inlet 3 at the upper portion of the chamber. The function of this gas outlet 5 is to maintain an inert gas atmosphere in the interior of the heating chamber 2 by displacing external gases (e.g. air and water vapor that have entered the chamber through the fiber inlet together with the fibers) with the ascending flow of the gas that has been introduced into the chamber from below. When the ascending flow of gas introduced into the furnace from below is drawn out of the system through the fiber inlet 3, the gas in the furnace is quenched at the inlet 3 and its nearby area, whereupon the decomposition gases in the furnace gas form a tar mist which builds up on the surface of the fibers or the fiber inlet to cause various defects such as the breakage of the fibers or the adhesion between filmanets. This can be effectively prevented by disposing the gas outlet 5 between the fiber inlet 3 and the first heating element 4*a* positioned below it. The gas outlet 5 is provided at such a position (i.e. distance from the fiber inlet 3) that the above-stated two objects are achieved: (1) the greatest portion of the decomposition gases in the heating chamber is drawn out of the system through the outlet 5, and (2) the air in the bundle of fibers introduced into the heating chamber is substantially completely replaced by an inert gas by the time the fibers have travelled from the fiber inlet 3 and the gas outlet 5. If necessary, the fiber inlet 3 may be heated to prevent the build-up of tar mist in that area.

The lower end of the heating chamber is provided with a fiber outlet 7 which communicates with a sealing mechanism (not shown). Above the fiber outlet 7 is positioned an inert gas inlet 6. An inert gas is usually supplied in the rate from 0.02–0.50 Nm/sec (calculated to the rate at the normal state). Preoxidized fiber is supplied to the heating chamber having the construction described above, where it is carbonized in the inner space (carbonizing chamber) and subsequently recovered through the sealing mechanism at the lower end. The sealing mechanism may be in any suitable from such as a liquid seal, roller seal or an inert gas curtain seal. The fibers coming out of the carbonizing chamber are either wound on a take-up roll or continuously supplied to another furnance held at higher temperatures. The heating elements 4*a*, 4*b* and 4*c* are so designed that the temperature within the heating chamber increases gradually in the travelling direction of the fibers. The stream of inert gas (which was not drawn out of the chamber) flows in the heating chamber in the direction opposite the travelling direction of the fibers.

In this embodiment of the apparatus of the present invention, inert gas injecting portions 8*a* and 8*b* are provided between the inert gas inlet 6 at the bottom of the heating chamber and the gas outlet 5 at the upper portion. Each of the inert gas injecting portions may be composed of a single hole (usually in the form of a horizontally elongated slit) or it may comprise a plurality of slit-like openings arranged side by side horizontally as shown in FIG. 2. With reference to FIG. 1, one insert gas injection portion is in the uppermost section of the chamber, one is at substantially the midpoint of the chamber and one is downstream thereof. The insert gas injecting portion may be formed on only one of the two opposing faces of the heating chamber wall, or it may be formed on both walls as shown in FIGS. 1 and 2. More effective removal of decomposition gases and the displacement of the furnance gas with an inert gas may be accompolished by disposing another injecting portion 8*c* above and in close proximity with the gas outlet 5 as shown in FIG. 1. FIG. 2 is an enlarged schematic view of inert gas injecting portions 8 and 8', gas outlets 10 and 10', and the nearby area.

Suitable inert gases are, for example, nitrogen, argon, helium and mixtures thereof.

The inert gas is injected through 8*a* and 8*b* after having heated by preheating elements 9*a* and 9*b* (and 9*c* if injecting portion 8*c* is also provided) to the temperature in the furnace or a higher temperature but not higher than the temperature in the furnace by more than 200°

C. The inert gas injected into the heating chamber through the inert gas injecting portions traverses the heating chamber to form a curtain of inert gas around each fiber thus providing a shield from the gas stream coming up from the lower part of the heating chamber. The ascending internal gas obstructed by the curtain of inert gas is drawn from the system through gas outlets 10*a* and 10*b* (and 5 when 8*c* is provided). The interior of the heating chamber is usually held at a pressure of approximately 2 to 100 $mmH_2O$, so by connecting the gas outlets 10*a*, 10*b* and 5 to pressure regulating valves 11*a*, 11*b* and 11*c*, the pressure within the heating chamber can be held constant as the gas is ejected from these outlets. Accordingly, no air will be drawn into the chamber through the fiber inlet 3. Like the inert gas injecting portion(s), the gas outlet(s) may be provided in one of the opposing faces of the chamber wall (as in FIG. 1) or in both walls (as in FIG. 2). In the former case, the outlet(s) may be formed below and in close proximity with the inert gas injecting portion or they may be formed in an area of the chamber wall which is the opposite side to the wall where the injection holes are formed and which is below and in close proximity with the injection holes. The gas outlets are preferably provided at a position as close as possible to the injection holes. If the fibers to be carbonized are in the form having a very great density (strand spacing in the case of strand) in the heating chamber, the hole arrangement shown in FIG. 2 is suitable, and if the density is small, any arrangement may be used.

Referring to FIG. 2, the inert gas injected through the injecting portions 8, 8' toward the fibers 1 forms a gaseous curtain around each fiber to obstruct the flow of the ascending gas, which is drawn out of the furnace through outlets 10 and 10'. At least one layer (usually more than one layer) of inert gas injecting portion is formed within the heating chamber, and a number of gaseous curtains equal to number of layer of the injecting portions are formed. One layer of injecting portion is usually formed between each of heating elements 4*a*, 4*b* and 4*c* in the furnace, and at least two layers of injecting portions preferably formed. The purpose of the present invention is satisfactorily achieved by not more than five layers of injecting portions.

Usually, fibers arranged into one vertical plane are supplied to the chamber. When fibers are supplied to the chamber as strands the strand spacing (number of strands per meter of width of the fiber plane) is usually from 50 to 400 strands/m (provided strands of 1,000–50,000 filaments/strand are used) and when fibers are supplied as tows they are usually spread to 2,000,000 to 10,000,000 denier/m. When fibers are supplied as fabric or non-woven cloth of not more than 500 $g/m^2$ can be effectively treated in the apparatus of the present invention. The fibers travel through the heating chamber under a tension which is at least sufficient to prevent them from contacting the wall of the chamber. The tension generally ranges from 1 to 600 mg/d, preferably from 50 to 300 mg/d. The travelling speed of the fibers depends on the length of the heating chamber and the temperature within that chamber. The speed usually ranges from 0.02 to 0.20 m/sec. The inert gas is injected at a flow rate sufficient to permit the ascending gas to be drawn out of the furnace through the gas outlets so that the concentration of the decomposition products in the ascending gas is preferably reduced to less than about 50%. For this purpose, when the inert gas is injected from the both sides of walls of the chamber wherein strands are arranged side by side, the flow rate of the inert gas in the direction vertical to the fiber surface generally ranges from 0.3 to 3 Nm/sec, preferably from 0.5 to 1.5 Nm/sec. The inert gas is preferably injected in such a direction that a horizontal gaseous curtain is formed within the heating chamber; therefore, it is directed into the heating chamber either horizontally or slightly downwardly. Part of the inert gas introduced is drawn out of the furnace together with the decomposition gases and the remainder ascends the furnace. In the apparatus of the present invention, the fibers are carbonized by being heated in a temperature which is gradually raised from about 300° C. to a temperature of not more than about 950° C., usually, about 900° C.

When the apparatus of the present invention is used to produce carbon fibers, the decomposition gases formed within the heating chamber can be discharged from the furnace with reduced chance of contacting the fibers being carbonized or the gas in the upper part of the furnace which is in the lower temperature zone. As a result, the amount of the decomposition gases that build up on the surface of the fibers or the wall of the furnace as a tar mist is reduced to such an extent that carbon fibers of good quality can be consistently produced over an extended period.

One embodiment of the present invention where carbon fibers are produced from acrylonitrile fibers with the apparatus of FIG. 1 is hereunder described. A strand or tow of preoxidized acrylonitrile fibers having a bonded oxygen content of 6–15 wt %, preferably 8 to 12 wt % is fed to the furnace through inlet 3, which is preferably preheated to 250°–350° C. to prevent tar deposition. The fibers pass through the upper part of the heating chamber that is being heated usually at approximately a temperature having an incline of from 300° to 500° C. by heating element 4*a*, and by the time when they reach the gas outlet 5, the gas, particularly air, contained in the bundle of fibers is replaced by the internal gas that has been present in the heating chamber, and is then discharged from the system through outlet 5. The replacement of the confined air by the internal gas must be thorough for the fibers which are usually supplied in the form of the bundle comprising 100 to 500,000 filaments. The fibers then pass through a zone where a curtain of an inert gas such as nitrogen, argon or helium is formed. Thereafter, they enter a second hot zone which is usually heated to have an incline of a temperature from about 500° to 700° C. by heating element 4*b*. The inert gas is preheated to the temperature of the zone below the gas inlet or a higher temperature that does not exceed that temperature by more than 200° C. The purpose of this preheating is to prevent the decomposition gases from being quenched by the introduced inert gas to form a mist and for minimizing the fluctuation of the temperature in the furnace. The inert gas should be blown against the fibers gently to prevent the formation of fiber fuzz or fluffs.

In the second hot zone, the fibers are subjected to a heat treatment at about 500°–700° C. for a period of about 10 to 60 seconds. Thereafter, they are passed through another curtain of inert gas, then to a third hot zone which is usually heated to a temperature having an incline of from about 750° to a temperature of 900° C. or more than 900° C. but not more than 950° C. by heating element 4*c*. The fibers are retained in this zone for about 5 to 40 seconds. The temperatures provided by heating elements 4*a*, 4*b* and 4*c* vary stepwise but the temperature within the heating tube gradually increases from top to bottom. Finally, the fibers are recovered from the system through fiber outlet 7 and a sealing mechanism. A preferred sealing mechanism is the combination of a curtain of nitrogen gas and a roller seal. The recovered fibers that have been carbonized to a small extent (so called pre-carbonized) are then fed to a furnace which is held at a higher temperature of about 900° to 1,500° C. in an inert gas atmosphere, and by holding them in that furnace for a period of about 35 to 200 seconds, carbon fibers having the following properties are obtained.

Fineness: 790–810 tex

Tensile modulus of elasticity: 23,900–25,000 kg/mm$^2$

Ultimate tensile strength: 415–450 kg/mm$^2$, coefficient of variation (CV)=4% or less Elongation at failure: 1.72–1.86%

The apparatus of the present invention can be operated continuously, for example, for 480 hours, with 300 bundles of 12,000 preoxidized filaments being fed simultaneously. The resulting carbon fibers have high quality in that they have few fluffs and cohering filaments and have uniform strength properties. As another advantage, decomposition gases formed in the apparatus can be recovered in high concentration, so the emission gas from the apparatus can be easily disposed in an incinerator.

When the same apparatus was operated continuously for about 320 hours without injecting an inert gas into the heating chamber and without drawing the internal gas from the furnace through several outlets, the furnace was partly obstructed by the fiber fluffs and tar mist deposited on the wall of the zone heated at temperatures between 300° and 700° C. The resulting product was fluffy, had a tensile strength of less than 350 kg/mm$^2$ (CV=9% or more) and was not uniform in its strength.

FIG. 3 shows an apparatus of another embodiment of the present invention. This apparatus is the same as that shown in FIG. 1 except that the apparatus of FIG. 3 has an additional heating chamber 12 which is provided downwardly in contact with the heating chamber 2. In the heating chamber 12 further carbonization of the fiber is conducted. In the heating chamber 12 the temperature is kept at a higher temperature than that of the heating chamber 2. The fibers which have been heated in the heating chamber 2 to a temperature up to 900°–950° C. are continuously path through the heating chamber 12. In the heating chamber 12 the fibers are heated in an inert gas atmosphere and at a temperature having a incline of from a temperature higher than the temperature of the heating chamber 2 to a temperature of not more than 1500° C. The thus carbonized fibers are recovered from the outlet 7.

EXAMPLE 1

A strand (comprising 12,000 filaments) of fibers prepared from a copolymer consisting of 98% by weight of acrylonitrile and 2% by weight of methylacrylate, and having an individual fineness of 0.9 denier was preoxidized in the air at 265° C. for 0.38 hour, at 275° C. for 0.20 hour and at 283° C. for 0.15 hour under a tension so that shrinkage of the fiber reached 50% of the free shrinkage at that temperature. The thus obtained preoxidized fibers had bonded-oxygen of 9.8% by weight.

The tow of preoxidized fibers was carbonized using the apparatus shown in FIG. 1. The strand was fed to the furnace through inlet 3, which was preheated to 350° C. The strand spacing was 140 strands/m. The temperature of the upper zone was heated to have an incline of a temperature of from 300° to 500° C. by the heating element 4*a*, in the same manner the middle zone was heated to 500°–700° C. by the heating element 4*b* and the lower zone was heated to 700°–900° C. by the heating element 4*c*. Nitrogen gas was used as the inert gas. The gas which introduced from the gas inlet 6 was heated to 600° C., the gases which were injected from 8*c*, 8*a* and 8*b* were heated to 400° C., 600° C. and 750° C., respectively. The flow rate of the gas in the chamber 2 was 0.15 Nm/sec. Flow rates at fiber surfaces at 8*c*, 8*a* and 8*b* were 1.00 Nm/sec, 0.75 Nm/sec and 0.50 Nm/sec, respectively. The carbonization of the fiber was conducted under a tension of 80 mg/d. The speed of the fiber was 0.11 m/sec and the residence time was 66 sec.

The interior pressure of the heating chamber was maintained at 3–7 mm$H_2O$ and decomposition gases were discharged from gas outlets 10*a*, 10*b* and 5. The recovered fibers that have been carbonized (pre-carbonized) were then fed to a furnace which was heated to a temperature having an incline of from 900° to 1420° C. and which was kept under $N_2$ gas atmosphere, and the fibers were held in that furnace for 60 seconds.

For comparison the same experiment was conducted except that the inert gas was not injected from 8*a*, 8*b* and 8*c* and the decomposition gas was not discharged from 10*a* and 10*b*.

The thus obtained carbon fibers had the following properties as shown in the following table.

| | The Present Invention | Comparison |
|---|---|---|
| Tensile Strength (kg/mm$^2$) | 450 kg/mm$^2$ | 350 kg/mm$^2$ |
| Tensile Modulus of Elasticity (kg/mm$^2$) | 24.0 × 10$^3$ kg/mm$^2$ | 24.0 × 10$^3$ kg/mm$^2$ |
| Elongation at Failure | 1.88 | 1.46 |
| Continuous Stable Manufacturing Period (Period during which continuous manufacturing carbon fibers can be conducted without causing fuzzy strands or breakage of fibers) | more than 480 hours | about 200 hours |

While the invention has been described in detail and with reference to specific embodiments thereof, it will be apparent to one skilled in the art that various changes and modifications can be made therein without departing from the spirit and scope thereof.

What is claimed is:

1. An apparatus for producing carbon fibers, comprising:

a vertical carbonizing furnace having a longitudinal axis, which vertical carbonizing furnace comprises wall means and having an upper and lower end and defining a heating chamber therein for carbonizing fibers, the furnace consisting essentially of, (i) a fiber inlet at the upper end of the chamber, (ii) an air tight sealed fiber outlet at the lower end of the furnace, (iii) an inert gas inlet provided on the wall of the chamber and above the fiber outlet, (iv) at least one inert gas injection means, formed in the wall of the chamber having an injection axis substantially perpendicular to said longitudinal axis, at least one inert gas injection means being substantially halfway along the heating chamber, each at least one inert gas injection means thereby forming a curtain of inert gas substantially perpendicular to said longitudinal axis in the heating chamber, each of the at least one inert gas injection means being provided between the inert gas inlet and the fiber inlet, (v) at least one gas outlet provided on the wall of the chamber at a lower portion of each of the at least one inert gas injection means as close as possible to each of the at least one inert gas injection means, and (vi) a heating member capable of controlling the temperature in the heating chamber in such a manner that the temperature gradually increases from 300° C. or more at the upper end to not more than 950° C. toward the lower end of the heating chamber.

2. An apparatus for producing carbon fibers as claimed in claim 1, wherein said heating chamber has an additional heating chamber provided above the inert gas inlet and downwardly connected with said heating chamber, said additional heating chamber having a heating member capable of heating the additional heating chamber to a temperature having an incline of from more than 900° C. to not more than 1500° C.

3. An apparatus for producing carbon fibers as claimed in claim 1, wherein said inert gas inlet is below said heating member.

4. An apparatus for producing carbon fibers as claimed in claim 1, wherein said inert gas inlet is provided with heating means to heat the inert gas.

5. An apparatus for producing carbon fibers as claimed in claim 1, wherein said inert gas introduced through the inert gas inlet is obstructed by inert gas introduced through the at least one inert gas injection means and withdrawn from the at least one gas outlet.

6. An apparatus for producing carbon fibers as claimed in claim 1, wherein said inert gas injection means is at an angle which provides a horizontal curtain of inert gas across the vertical carbonizing furnace.

7. An apparatus for producing carbon fibers as claimed in claim 1, wherein said inert gas injection means provides a curtain of inert gas slightly downward in the vertical carbonizing furnace.

8. An apparatus for producing carbon fibers as claimed in claim 1, wherein the heating member comprises three heaters, an uppermost heater providing a temperature of 300° to 500° C., a middle heater providing a temperature of 500° to 700° C. and a lowermost heater providing a temperature of 750° to 950° C.

9. An apparatus for producing carbon fibers as claimed in claim 1, wherein an additional gas outlet is provided on the wall of the upper portion of the heating chamber at a point between the fiber inlet and the heating member.

10. An apparatus for producing carbon fibers as claimed in claim 1, wherein the at least one inert gas injection means comprises at least one slit like opening arranged horizontally on the wall of the chamber.

11. An apparatus for producing carbon fibers as claimed in claim 10, wherein the furnace comprises a plurality of said inert gas injection means comprising at least one slit like opening, forming a plurality of injecting means capable of forming curtains of inert gas.

12. An apparatus for producing carbon fibers as claimed in claim 11, wherein the plurality of said inert gas injection portions includes 2 to 5 slit like openings spaced along the wall of the chamber each of which forms a separate inert gas curtain.

* * * * *